United States Patent [19]

Brock et al.

[11] 3,727,303

[45] Apr. 17, 1973

[54] METHOD OF FORMING GAPS FOR SMALL MAGNETIC HEADS

[75] Inventors: George W. Brock, Raymond Stephens, both of Boulder, Colo.

[73] Assignee: International Business Machine Corporation, Armonk, N.Y.

[22] Filed: June 4, 1971

[21] Appl. No.: 149,973

[52] U.S. Cl. ..............................29/603, 179/100.2 C

[51] Int. Cl. ..............................G11b 5/42, H01f 7/06

[58] Field of Search ..................29/603; 179/100.2 C; 340/174.1 F; 346/74 MP, 74 MC

[56] References Cited

UNITED STATES PATENTS

| | | | |
|---|---|---|---|
| 2,431,540 | 11/1947 | Camras | 179/100.2 C |
| 3,386,101 | 5/1968 | Sims, Jr. | 346/74 MP |
| 3,012,232 | 12/1961 | Eckert, Jr. et al. | 346/74 MP |
| 2,950,161 | 8/1960 | Rueger | 346/74 MP |

*Primary Examiner*—Charles W. Lanham
*Assistant Examiner*—Carl E. Hall
*Attorney*—Hanifin & Jancin and Gunter A. Hauptman

[57] ABSTRACT

A small multi-element magnetic recording head reads and writes information on magnetic medium information tracks corresponding to head gaps. The head is a single magnetic strip having a plurality of gaps extending from one edge of the strip to apertures aligned along that edge. Conductors are associated with the apertures. One embodiment of the head is formed by coating the strip with an acid-resistant mask, punching the apertures, shearing the gap, etching the strip, and annealing the strip. Another embodiment of the head is constructed by wrapping a composite wire around a mandrel and then plating, drilling, and cutting a cross-section of the wrapped wire.

15 Claims, 16 Drawing Figures

METHOD OF FORMING GAPS FOR SMALL MAGNETIC HEADS

CROSS-REFERENCES

The following commonly assigned applications are all pertinent to the subject matter hereof:

Ser. No 149,974, filed June 4, 1971, "Skewed High Density Magnetic Head and Method of Manufacturing Same," by G. Taylor;

Ser. No. 149,975, filed June 4, 1971, "Batch Fabricated Magnetic Head Tester and Testing Method," by S. M. Barrager and S. H. Smith; and Ser. No. 149,976, filed June 4, 1971, "Improved Batch Fabricated Magnetic Head Tester and Testing Method," by S. M. Barrager, G. Bate, and S. H. Smith.

BACKGROUND OF THE INVENTION

1. Field of the Invention

The invention generally relates to electrical data processing and, more particularly, to a method of making magnetic recording heads.

2. Description of the Prior Art

The formation of small apertures and narrow gaps, on the order of 100 microinches in ductile materials, about 1,000 microinches thick, presents the possibilities of inaccuracy, unpredictable magnetic and electrical effects, etc. Tools available in the prior art are generally inapplicable to this problem because they create undesirable stresses, inaccuracies, burrs, etc. Another prior art approach to the aperture and gap-cutting problem has been to apply an acid-resistant mask to the strip, lightly punch the aperture and scribe the gap, and then acid-etch the strip to the final desired dimension. Accurate aperture and gap formation is, however, not possible because surface-applied acid cannot attack the strip uniformly throughout its thickness.

SUMMARY OF THE INVENTION

Accuracy and stress-elimination are achieved by forming the gaps throughout the head thickness in one step. In one embodiment, an etchant forms the aperture and gap throughout the entire strip thickness simultaneously. The strip is first coated with a mask, the aperture is punched through the strip (lightly to a rough size) and the gas is sheared. Then the strip is etched to form the final aperture and gap dimensions and remove deformed edges. The gap shearing may be accomplished by scissoring or punching gaps. In scissoring, inter-gap sections are curved, whereas, they are substantially straight when punched. In another embodiment, the "gap" originates as a non-magnetic layer on a magnetic strip of foil or wire. When the strip is wound on a mandrel, on layer for each gap, each sandwiched conductive layer defines a gap. The wound strip is subsequently separated into head elements by cutting slices out of its cross-section. The apertures are formed by appropriate machining techniques.

The foregoing and other features and advantages of the invention will be apparent from the following more particular description of preferred embodiments of the invention, as illustrated in the accompanying drawings.

DETAILED DESCRIPTION OF THE INVENTION

A transducer records information as magnetic areas on a medium by translating electrical signals into magnetic fields. The same transducer may also detect magnetic areas on a medium and translate them into electrical signals. Such transducers, commonly called magnetic read/write heads, usually operate by sensing the change in flux of a magnetic medium moving past the transducer. It is not essential that the medium move past the head, it being possible to move the head—the only requirement is that there be relative motion between the medium and the transducer to gain access to successive bits. A high bit density is considered to be 10,000 flux changes per inch (fci) and a high track density is considered to be between 500 and 2,000 tracks per inch at a high data rate of approximately 2.5 megahertz (MHz).

Magnetic Head Structure (FIGS. 1–3)

Figure 1A:
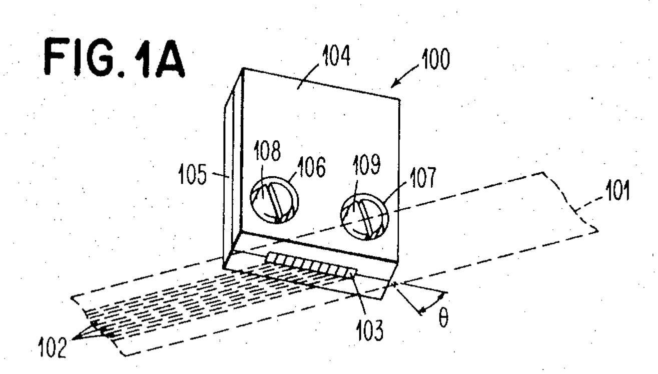
FIG. 1A shows a read/write head assembly for reading and writing information stored on a magnetic tape medium.

In order to obtain the desired high bit density, high track density and high data rate, it is desirable to operate the magnetic read/write head in a semitransverse mode. That is, the head is not necessarily mounted perpendicular to the relative motion between the head and the media. Referring first to FIG. 1A, there is shown a magnetic read/write head assembly 100 (for simplicity referred to as a magnetic head) mounted at an angle $\theta$ relative to a line across a magnetic tape 101. The magnetic head 100 is a transducer element 103 comprising a plurality of gaps each corresponding to a track 102 on the tape 101. As will be explained, the transducer element is a batch-fabricated thin film, foil strip or sheet, wherein each gap is defined by a slot, fastened between subassemblies 104 and 105 by fasteners 108 and 109 placed through fastening holes 106 and 107. As shown in more detail with reference to FIGS. 2A through 2E, the angle $\theta$ determines the number of tracks 102 which may be recorded on the magnetic tape 101 and the spacing and width of these tracks.

Figure 1B:
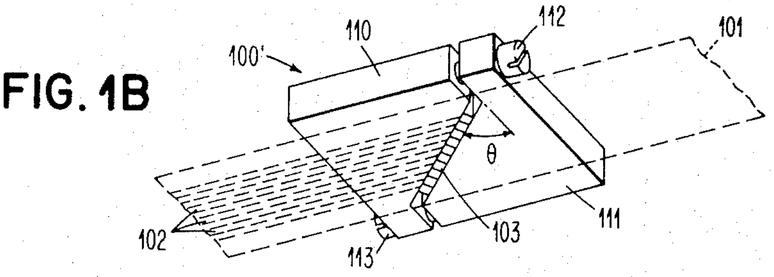
FIG. 1B shows another embodiment of a read/write head assembly for reading and writing information stored on a magnetic tape medium.
Figure 1C:
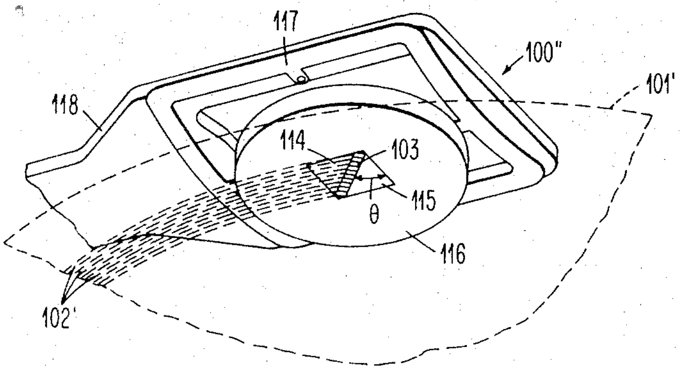
FIG. 1C shows a read/write head assembly for reading and writing information stored on a magnetic disk medium.

FIGS. 1B and 1C show two different embodiments 100′ and 100″ of the magnetic head 100 of FIG. 1A. Referring first to FIG. 1B, the magnetic head 100′ differs from the head 100 primarily in the subassemblies fastening the element 103 in position across the magnetic tape 101. The subassemblies 110 and 111 are held together by fasteners 112 and 113. The subassembly of FIG. 1B provides a surface with a lower profile than that of FIG. 1A. Referring now to FIG. 1C, a flying arm 118 supports the head 100″ to provide a floating structure capable of reading magnetic tracks 102′ on a rotating magnetic disk 101′. The element 103 is mounted at an angle $\theta$, relative to a line through the arm 118, in a mounting comprising sections 114 and 115 centered in a holder 116 which is loaded onto the arm 118 by the spring 117.

Figure 2B:
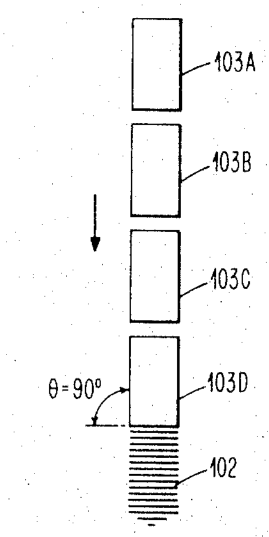
FIGS. 2A through 2E diagrammatically show the tracks on which information may be recorded by a read/write head positioned at varying angles relative to a medium.
Figure 2A:
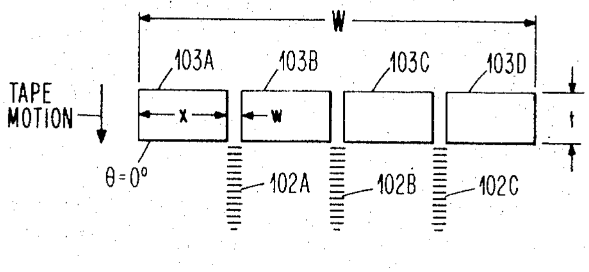
Figure 2C:
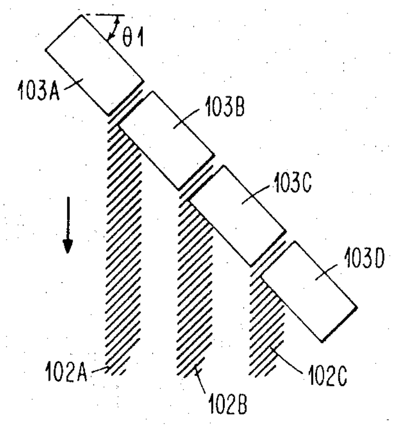
Figure 2D:
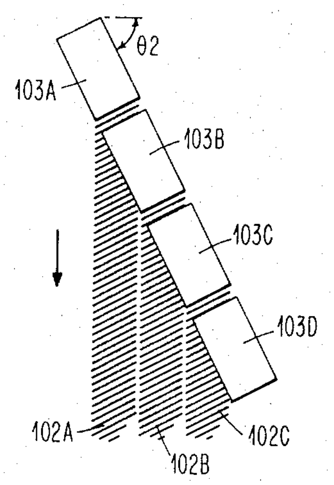
Figure 2E:
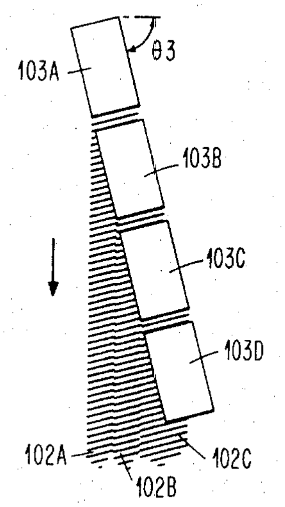

Referring now to FIGS. 2A through 2E, there are shown, in end views, details of the element 103 and the tracks 102 on the tape 101. The same details apply to tracks 102′ of disk 101′. The elements 103 having a thickness $t$ consist of a number $n$ of sections, illustratively, shown as 103A through 103D and the tracks corresponding thereto are numbered 102A through 102C. It should be noted that a magnetic track designation corresponds to a gap between two element; for example, the gap having a width $w$ between element sections 103A and 103B results in track 102A. Referring first to FIG. 2A, there is shown the standard tape head-to-magnetic-track configuration wherein the head is mounted transverse ($\theta_0$=0°) to the magnetic tape or disk motion. The tracks 102A through 102C will have a width equal to the distance W between each of the head elements 103A through 103D (called "gap length" in the prior art) and a spacing equal to the cross-section $x$ of the elements 103A through 103D (called "gap width" in the prior art). Conventionally constructed prior art heads orient their gaps along axis 90° removed from the axis shown. Referring now to FIG. 2B, if the head element 103 is placed parallel to the track motion, ($\theta_{90}$=90°), the single track 102 will have a width equal to the thickness $t$ of the head element 103. (This is the gap orientation in a conventional head.) Referring to FIGS. 2C through 2E, a variety of head angles progressing from $\theta 1$ through $\theta 3$ is shown. It can be seen that as the angle increases from more than 0° toward less than 90°, the track width ($t \sin \theta$) increases and the total space between $n$ tracks ($W \cos \theta - n\, t \sin \theta$) decreases.

FIG. 2C shows a skew angle $\theta 1$ of approximately 45° where the track width and intertrack gap are approximately equal and the recorded track is slightly less than the gap width (thickness $t$ of the element 103). In FIG. 2D, the spacing between the tracks at $\theta 2$ is practically zero, and the track widths occupy almost the entire space upon the media available for recording and reading. If the skew angle is approximately 27.5°, the tracks become contiguous giving approximately 500 tracks per inch for an element thickness of approximately 0.002 inch and a center to center spacing of 0.004 inch. Referring to FIG. 2E, where the head angle is increased to $\theta 3$, the tracks 102A through 102C overlap.

In FIG. 2E, a skew angle of $\theta 3$=75° causes the tracks to overlap. Each of the tracks is approximately 0.001 inch wide and there are about 1,000 per inch. An increase in the skew angle can achieve up to 2,000 tracks per inch. It would be expected by one skilled in the art that if the recording gaps are displaced by 0.004 inch and the gaps are driven by high currents on the order of 1 ampere, adjacent tracks would be excited and cross-talk would occur. However, in testing the invention with alternate tracks driven at 500 and 1,000 flux changes per inch, respectively, with 1 ampere of write current it was observed that signals recorded on adjacent tracks were clearly defined and undisturbed.

Figure 3A:
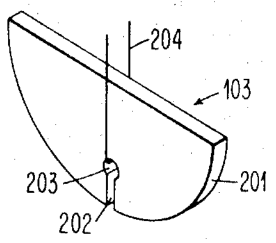
FIGS. 3A through 3C show various configurations of batch fabricated magnetic read/write head elements.
Figure 3B:
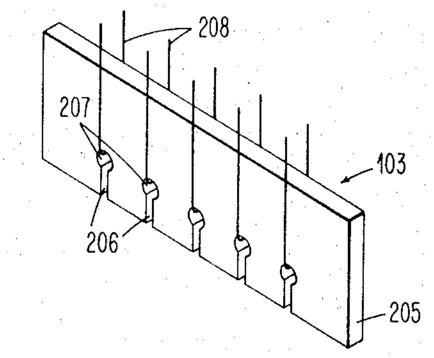
Figure 3C:
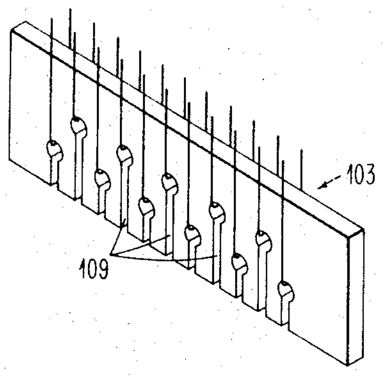

FIGS. 3A through 3C show a number of embodiments of batch fabricated elements 103 intended for mounting in transducers 100, 100′ and 100″ of FIGS. 1A–1C. Referring first to FIG. 3A, a single track foil or laminated head element is shown. The material 201 is a magnetic material such as HyMu 80, Mo Permalloy or equivalent, having a thickness ranging from 0.00025 inch to 0.002 inch. The head element includes an aperture 203 having a diameter on the order of 0.0025 inch and a gap running from the aperture to the edge of the material 201 having a gap width on the order of 0.0002 inch. A winding 204 passes through the aperture 203. While a single winding 204 is shown, it is possible to loop the winding 204 through the aperture 203 any number of times desired to give greater signal strength for both recording and reading.

The concept of FIG. 3A may be extended to a plurality of parallel tracks as shown in FIG. 3B. Each of the tracks has a corresponding aperture 207 and a slot forming a gap 206 in the material 205. Windings 208 pass through each of the apertures 207 in the manner previously described with reference to FIG. 3A. Similarly, FIG. 3C shows an alternative scheme permitting closer placement of gaps with limited structural weakening of the material by the apertures. Extension of this concept to thin film technology is also possible by placing conductive and magnetic elements on a substrate, as will be explained below with reference to FIG. 4.

In the case of transverse motion, as shown in FIG. 2A, while the tracks can be made very narrow (on the order of 0.00025 inch through 0.0005 inch wide), the track pitch is limited by the thickness of the wires 208 used to drive the elements 103. Thus, for wire 0.002 inch thick, the center to center spacing is limited to 0.004 inch and 250 tracks per inch. On the other hand, as shown in FIG. 2B, the track width may be limited only by the element thickness, that is 0.001 inch through 0.002 inch, to give 500 to 1,000 tracks per inch. However, this creates the problem that all the tracks are powered in the same plane and each succeeding track therefore erases the data recorded by the preceding track. Thus, one of the positions shown in FIGS. 2C–2E will be preferable.

Figures 5A, 5B:
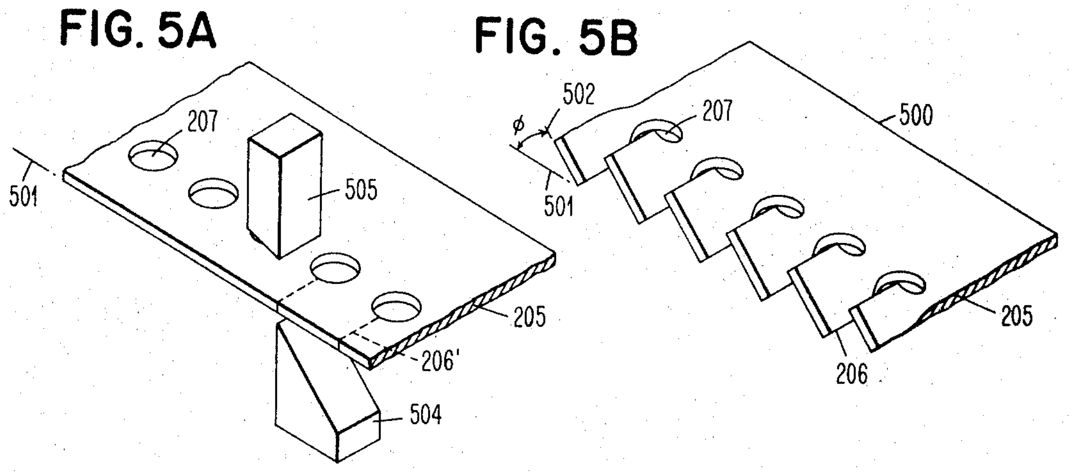
FIGS. 5A through 5C show several techniques for forming gaps in magnetic read/write head elements of the type shown in FIG. 3B.
Figure 5C:
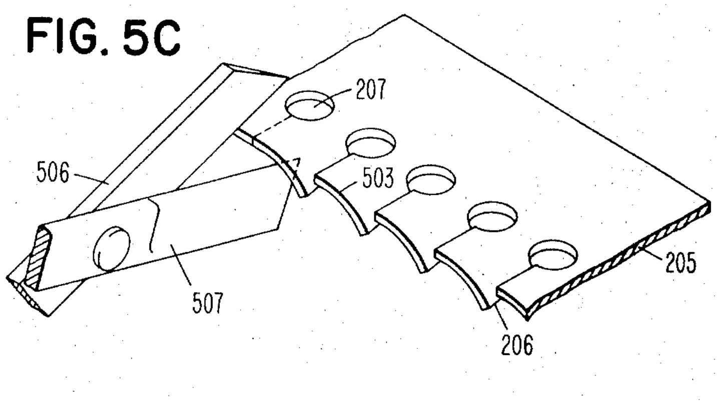
Figure 6:
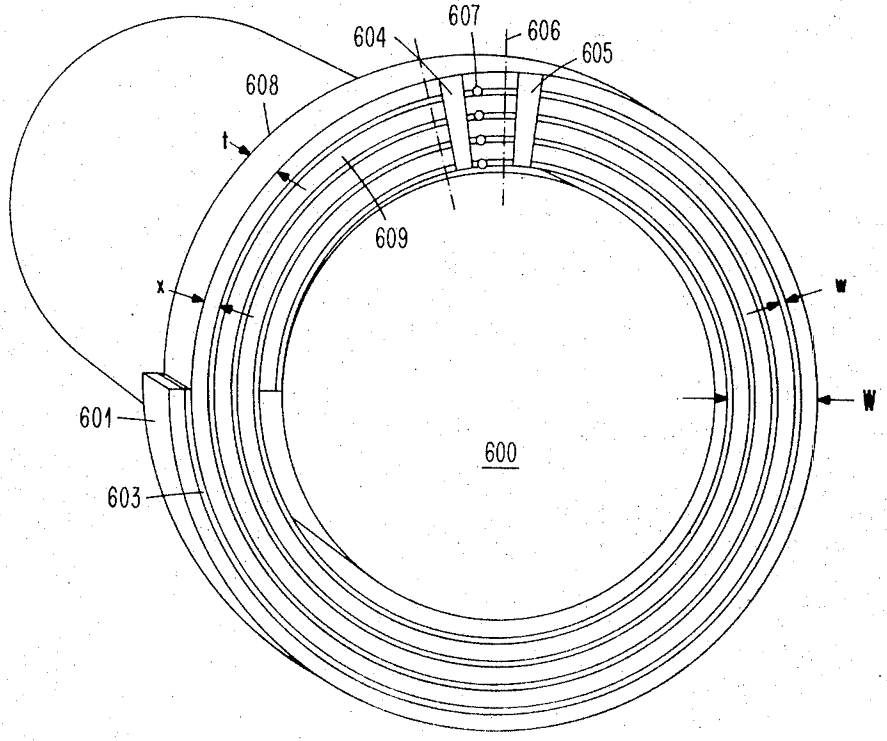
FIG. 6 shows an alternative technique for manufacturing the magnetic read/write head element of FIG. 3B.
Figure 4:
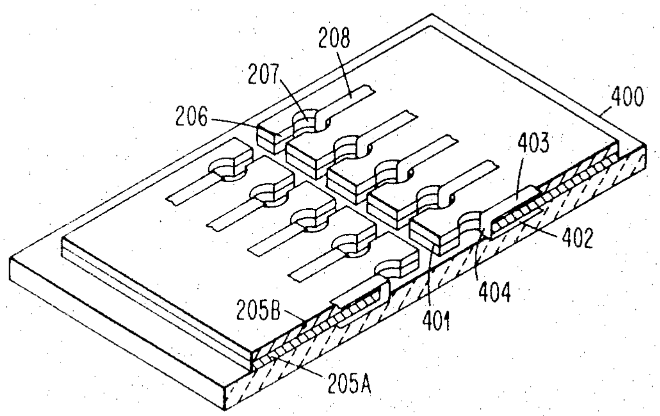
FIG. 4 is a detailed view showing construction of one embodiment of FIG. 3B.

Manufacturing Methods (FIGS. 4–6)

Magnetic head elements referred to in FIGS. 1–3 are manufactured by a number of techniques including thin film evaporation, lamination, shearing, etc. Referring to FIG. 4, thin film deposition or foil bonding techniques can form head elements of the type shown in FIG. 3B. A substrate 400 comprising an insulating material such as glass carries an insulating layer 205A and a magnetic material 205B. A winding 208 passes through apertures 207 and gaps are formed by slots 206 extending from the aperture 207 to the front surface 401 of the head element. The winding 208 is formed in three sections including a bottom section 402, a top section 403 and a center section passing through aperture 207. The normal thin film construction steps include evaporation of the conductor 402 on the substrate 400 followed by evaporation of the insulating and magnetic layers in order. The apertures and the slots may then be etched and the conductor 404 and 403 added by appropriate masking, evaporation and etching steps. There is interposed a variety of spraying, oxidizing and glassing steps well known in the art. Prior to utilization of the head element, it is removed by shearing along a line through front surface 401. An alternative technique for manufacturing the head of FIG. 4 uses a laminated foil material, comprising insulator 205A and magnetic material 205B, and etching and deposition steps otherwise similar to those previously described.

Referring now to FIGS. 5A and 5B, an alternative technique for forming the slots 206 will be explained. The material used to form the heads may be the magnetic material 205B shown in FIG. 4 or it may comprise a sandwich 205 including an insulator and a magnetic material. In either case, the material is covered with a masking resist. The first step in the manufacture of the slots is to define a line, from the aperture 207 to the edge 501 of the material 205, along which the slots will be formed. A punch 504 and die 505 are mated along each of the lines 206' to form the gaps 206 as shown in FIG. 5B. The successive die and punch operations skew lines 502 relative to the base line 501 at an angle $\phi$. A single punch 504 and die 505 may be used or a plurality of punches and dies may be simultaneously applied to the material 205. In each case, the surface 501 will be broken up into successive segments having an angle $\phi$ relative to the original base line 501. The material 205 is then etched to increase the ultimate slot size and smooth the slot edges. Next, the resist covering the material 205 is stripped from the part. The part 205 is then flattened, annealed and the surface is, if desired, oxidized. The end result is a stress free head element having a gap 206 which is evenly formed.

Referring now to FIG. 5C, a technique similar to the one described with reference to FIGS. 5A and 5B utilizes a scissoring action of opposed blades 506 and 507. The effect is to form a curved surface 503 as opposed to the flat surface in the techniques of FIGS. 5A and 5B. The subsequent steps however, are identical to those previously described.

Alternative techniques for forming gaps and other dimensions exist. For example, a line may be scratched from the aperture to the edge and the slot etched, cut, sawed, laser, or electro-discharge machined or electron beam machined, etc. Since the material is originally covered with a resist, the etchant attacks only the scratched area. The apertures may be formed similarly or by countersinking the surface and etching or by punching the holes entirely.

Referring now to FIG. 6, still another technique for manufacturing a head element of the type shown in FIG. 3B is shown. An annealed or unannealed flat magnetic foil strip or wire 601 such as HyMu 80 or its equivalent having a thickness t and cross-section $x$ is plated by evaporation or some other appropriate technique with a gap material 603, such as copper, to a width $w$. It is possible to plate a width of one-half $w$ on each side of the strip 601, though the strip is shown plated on only one side. The plated strip 601 is coiled about a mandrel 600 having a diameter $d$ which is much larger than the wire cross-section $x$. The wound strip may then be annealed, for example at approximately 1,200° Fahrenheit, until light diffusion bonding occurs at the interface between materials 601 and 603. The face 609 of the wound strip is then appropriately masked off to permit the plating of additional magnetic material 604, 605, etc.; for example, permalloy, at successive points around the wound strip. Holes 607 are then drilled, punched, or otherwise formed by techniques known in the art (such as the use of laser beams) and the outside face is potted to permit removal of the mandrel. A wire saw or laser may then be used to cut the successive sections along lines 606, etc. from the wound strip, and the back 608 is lapped to produce the required track width. The manufacturing technique produces a magnetic head having gaps $w$ wide, with a pitch between the gaps of $x + w$ and a track width of $t$ or less.

While the invention has been particularly shown and described with reference to preferred embodiments thereof, it will be understood by those skilled in the art that various changes in form and details may be made therein without departing from the spirit and scope of the invention.

What is claimed is:

1. The method of manufacturing magnetic heads comprising areas on a planar magnetic strip having a thickness t, each area defining a separate head element and including a small head gap having a width $w$, where $t > w$, including the steps of:

coating the magnetic strip with a masking material;

punching a plurality of apertures along an edge, one aperture for each area defining a separate head element;

shearing the strip along lines from each of the apertures to the edge to produce lips and roughly define head gaps, the strip becoming deformed, along the shear lines, out of the plane of the strip;

etching the strip in a metal chloride solution to accurately form the head gaps and apertures; and flat annealing the strip.

2. The method of claim 1 applied to heads having gaps of less than 100 microinches and strips approximately 1,000 microinches thick.

3. The method of claim 2 wherein the etching is continued for approximately 15 seconds at approximately 125° F.

4. The method of claim 2, wherein the masking material is a photoresist.

5. The method of claim 3, wherein the etching solution is ferric chloride.

6. The method of claim 1 wherein the shearing step skews the lips relative to each other to maintain substantially straight lines along the sheared edges which lines are parallel to each other.

7. The method of claim 1 wherein the shearing step skews the lips relative to each other to cause aforesaid lines along the sheared strip edges to assume a curved shape defined as a segment of an arc.

8. The method of claim 2 wherein the shearing step skews the lips relative to each other, lines along the strip edges being substantially straight and parallel to each other.

9. The method of claim 2 wherein the shearing step skews the lips relative to each other, aforesaid lines along the sheared strip edges describing a curved path not intersecting a line through the opposite edge of the strip.

10. The method of claim 3 wherein the shearing step causes the lips to assume a set defined by nonintersecting lines, along the strip edges, which are substantially straight.

11. The method of claim 3 wherein the shearing step causes the lips to assume a set defined by said lines along the sheared strip edges, said lines describing an arc and having a non-parallel relationship with the opposite edge of the strip.

12. The method of claim 4 wherein the shearing step skews the lips relative to each other to maintain substantially straight lines along the strip edges which lines are parallel to each other.

13. The method of claim 4 wherein the shearing step skews the lips relative to each other, aforesaid lines along the sheared strip edges describing a curved path not intersecting a line through the opposite edge of the strip.

14. The method of manufacturing batch-fabricated aperture-gap magnetic heads by:

applying a masking material to the surface of a thin magnetic planar sheet having a front edge and an opposing back edge;

forming a plurality of holes in a straight line parallel to the front edge of the sheet;

shearing a narrow gap along a gap line from each hole and perpendicular to the front edge wherein the narrow gaps are sheared by forcing the sheet upward on one side of the gap line and downward on the other until the material shears along the gap line and assumes a set along the gap line and out of the plane of the magnetic sheet; and etching the sheared gap to achieve a predetermined gap size.

15. The method of manufacturing batch-fabricated aperture-gap magnetic heads by:

applying a masking material to the surface of a thin magnetic planar sheet having a front edge and an opposing back edge;

forming a plurality of holes in a straight line parallel to the front edge of the sheet;

shearing a narrow gap along a gap line from each hole and perpendicular to the front edge wherein the shearing displaces the front edge into a non-parallel relationship with respect to the back edge and assumes a set along the gap line and out of the plane of the magnetic sheet; and etching the sheared gap to achieve a predetermined gap size.

* * * * *